US008899763B2

(12) United States Patent
Martinez-Val Peñalosa et al.

(10) Patent No.: US 8,899,763 B2
(45) Date of Patent: Dec. 2, 2014

(54) DEVICE FOR CONCENTRATING SOLAR RADIATION WITH LONGITUDINAL MIRRORS AND A LONGITUDINAL RECEIVER

(75) Inventors: Jose Maria Martinez-Val Peñalosa, Madrid (ES); Manuel Valdes Del Fresno, Madrid (ES); Alberto Abanades Velasco, Madrid (ES); Ruben R Amengual Matas, Madrid (ES); Mireia Piera Piera Carrete, Madrid (ES); Maria Jose Montes Pita, Madrid (ES); Antonio Rovira De Antonio, Madrid (ES); Javier Muñoz Anton, Madrid (ES)

(73) Assignees: Universidad Politecnica de Madrid, Madrid (ES); Universidad Nacional de Educacion a Distancia, Madrid (ES)

( * ) Notice: Subject to any disclaimer, the term of this patent is extended or adjusted under 35 U.S.C. 154(b) by 227 days.

(21) Appl. No.: 13/698,959

(22) PCT Filed: May 18, 2011

(86) PCT No.: PCT/ES2011/000163
§ 371 (c)(1),
(2), (4) Date: Feb. 5, 2013

(87) PCT Pub. No.: WO2011/144773
PCT Pub. Date: Nov. 24, 2011

(65) Prior Publication Data
US 2013/0128329 A1 May 23, 2013

(30) Foreign Application Priority Data

May 19, 2010 (ES) .................................. 201000644

(51) Int. Cl.
G02B 26/08 (2006.01)
F24J 2/07 (2006.01)
F24J 2/10 (2006.01)
F24J 2/16 (2006.01)
F24J 2/54 (2006.01)

(52) U.S. Cl.
CPC ............... *G02B 26/0816* (2013.01); *F24J 2/07* (2013.01); *F24J 2/1047* (2013.01); *F24J 2/16* (2013.01); *F24J 2/541* (2013.01); *Y02E 10/47* (2013.01); *Y02E 10/41* (2013.01)
USPC ......... 359/853; 60/641.15; 126/685; 126/692

(58) Field of Classification Search
CPC ............... F24J 2/07; F24J 2/1047; F24J 2/16; F24J 2/541; Y02E 10/41; Y02E 10/47; G02B 26/0816
USPC ......... 136/246, 259; 359/212.1, 212.2, 221.3, 359/223.1, 226.1, 226.2, 838–884; 126/684, 685, 692, 693, 696; 60/641.15, 641.8
See application file for complete search history.

(56) References Cited

U.S. PATENT DOCUMENTS

| 4,243,019 A | 1/1981 | Severson | |
|---|---|---|---|
| 2006/0249143 A1 | 11/2006 | Straka | |
| 2008/0128017 A1 | 6/2008 | Ford | |
| 2009/0084374 A1* | 4/2009 | Mills et al. | 126/684 |
| 2010/0051018 A1* | 3/2010 | Ammar et al. | 126/634 |
| 2010/0116320 A1* | 5/2010 | Grassmann | 136/246 |

FOREIGN PATENT DOCUMENTS

| BE | 1 103 565 | 4/2002 |
|---|---|---|
| BE | 1 103 566 | 4/2002 |
| DE | 10 2008 021 730 | 11/2008 |
| DE | 10 2007 052 338 | 5/2009 |
| EP | 2 161 516 | 3/2010 |
| WO | WO 99/42765 | 8/1999 |
| WO | WO 02/02995 | 1/2002 |
| WO | WO 02/12799 | 2/2002 |
| WO | WO 2006/000834 | 1/2006 |
| WO | WO 2009/023063 | 2/2009 |
| WO | WO 2009/029275 | 3/2009 |
| WO | WO 2009/029277 | 3/2009 |

OTHER PUBLICATIONS

International Search Report for International application No. PCT/ES2011/000163 mailed Aug. 30, 2011. (3 pages).

* cited by examiner

*Primary Examiner* — Ricky Mack
*Assistant Examiner* — Gary O'Neill
(74) *Attorney, Agent, or Firm* — Merchant & Gould P.C.

(57) ABSTRACT

A device for concentrating solar radiation (4) with longitudinal mirrors (7) and a longitudinal receiver (1), has mirrors with a circular cross-section with a radius of curvature that is twice the transverse distance from the center (35) of each mirror to the central point (3) of the receiver. The width of the receiver is 1% of the transverse distance from the central point to the center (89) of the furthest mirror (32). The width of each mirror is determined according to the drift of the rays reflected when the mirror focuses the sun, prescribing an equal width for all mirrors, which is: equal to the width of the active face (2) of the receiver when mounted according to the meridian; and triple the width of the active face (2) of the receiver when mounted according to the parallel of latitude. The mirrors are installed in a contiguous manner and the receiver is installed at a height on columns (8).

5 Claims, 5 Drawing Sheets

DEVICE FOR CONCENTRATING SOLAR RADIATION WITH LONGITUDINAL MIRRORS AND A LONGITUDINAL RECEIVER

This application is a National Stage Application of PCT/ES2011/000163, filed 18 May 2011, which claims benefit of Serial. No. P20100644,filed 19 May 2010 in Spain and which applications are incorporated herein by reference. To the extent appropriate, a claim of priority is made to each of the above disclosed applications.

FIELD OF THE ART

The invention is encompassed within the field of solar energy power plants requiring concentration of source radiation, which in this case is reflected by a series of longitudinal mirrors the longer axes of which are horizontal or slightly inclined, and can be transversally oriented by rotating about their longitudinal axis of symmetry; the reflected radiation being focused on an also longitudinal receiver, with its long axis being horizontal or slightly inclined, and with a certain transverse inclination, and parallel to the axes of the mirrors. Said receiver can have very diverse structures and be made up of very different materials as it can be intended for high-temperature thermal uses, photovoltaic conversion, photochemical or thermochemical processes, or any phenomenon needing visible or near infrared electromagnetic radiation. In any case, the receiver will have an active surface or face, which is truly relevant for the purposes of this invention and is the area where the concentrated radiation strikes and is absorbed. This area can be the surface of a photodiode array for carrying out the direct generation of electricity by photovoltaic effect; or a radiation absorbing surface physically connected with a group of parallel tubes the axes of which are in turn parallel to the longitudinal mirrors and through the inside of which a heat transfer fluid transporting the absorbed solar heat to a useful purpose, such as a thermodynamic power production cycle, circulates.

BACKGROUND OF THE INVENTION

There are many background documents relating to fields of mirrors that can be oriented, but specifically relating to the longitudinal horizontal planar case, international application WO 99/42765 is mentioned, in which the receiver is a longitudinal tube similar to that used in parabolic trough collectors like that described in U.S. Pat. No. 4,243,019 and several others. Other background documents worth mentioning include the following: WO 2009/029277 A2 disclosing a conventional Fresnel reflection configuration with multi-tube receiver, and a number of configuration variants, though without numerical assembly requirements and with very generic claims; using planar mirrors in FIGS. 3 and 4 and concave mirrors, without further specification, in FIG. 12, also discussing the configuration of hydraulic circuits in the multi-tube receiver, without taking into account the natural aperture of sunlight; WO 2009/023063 A2 discloses a receiver inclined with respect to the ground with an asymmetric structure to favor collecting radiation; WO 2006/000834 A1 proposes mirrors with multiple planar facets, and it further relates to mechanisms for suitably focusing the planar mirrors on the receiver; WO 02/12799 A2 discloses a bi-parabolic concentrator around the receiver tube which mentions, without geometric specifications, "flat rotating mirrors" in the field of mirrors in claims 9 and 10; WO 02/02995 A2 relates to a basic Fresnel reflection system with a novel modality for supporting the tube; EP 2 161 516 A1 relates to a classic Fresnel reflection system in which propagation of the beam with the concentration characteristic of concave mirrors is envisaged, though it does not claim any requirement on the shape of such mirrors; BE 1 013 565 A3 discloses an absolutely basic Fresnel reflection, cited as a background in some of the aforementioned patents and using mirrors with multiple planar facets; BE 1 013 566 A3 also discloses Fresnel reflection, in this case with concave mirrors to concentrate the radiation on the tube receiver, though without specifying equations for defining the profiles of the mirrors or submitting illustrative drawings on the problem with concentration of solar radiation due to its natural aperture.

TECHNICAL PROBLEM TO SOLVE

Concerning all these background documents, it must be said that they ignore the fundamental physical fact that solar radiation is not perfectly collimated, but comes from the Sun, which has an optical aperture from Earth of 32' (sexagesimal minutes), its intensity being virtually uniform in the entire Sun, as corresponding to radiation emitted in a perfectly diffused manner from a spherical surface. This aperture means that the radiation striking a point of the Earth's surface is not simply made up of a ray from the Sun, but is a cone of rays the conical angle of which is precisely the aforementioned 32'. Therefore, and depending on the light reflection principle, a single ray does not emerge from the point in question, but a group of rays, or beam, with an aperture exactly equal to that of the striking beam, i.e., 32'. This aperture is equivalent to 0.0093 radians (or 1/107.5 radians), meaning that when the beam covers increasingly longer distances, the surface of its perpendicular section becomes increasingly larger, which produces a low intensity in the receiver absorbing solar radiation.

That low value of radiation received prevents the heat transfer fluid circulating through the tubes of the absorber from reaching high temperatures, or in the photovoltaic case, prevents the necessary radiation from reaching high performance cells which can only be manufactured in small amounts because they are so expensive but perform well when they are illuminated with an intensity tens of times greater than natural intensity.

With current concentration systems referred to as Fresnel reflection or longitudinal systems, which have a much less expensive construction than other concentration systems, it is impossible to achieve high radiation concentration values. Therefore, the problem to solve is reaching said sufficiently high concentration values in a device with this basic geometry, sizing its constitutional elements in a novel manner, taking into account the natural aperture of sunlight and drift, or shift in path, of the rays reflected by a mirror when the mirror is rotated for focusing on the sun in any position not coinciding with the reference position which is used to define its geometry.

OTHER PRIOR CONSIDERATIONS

In the application herein filed, the invention is based on an array of slightly transversally concave mirrors parallel to one another, with a markedly longitudinal geometry, i.e., being much longer than it is wide. The mirrors do not have more than one degree of rotational freedom, and its rotating shaft specifically coincides with its longitudinal axis of symmetry, which in turn is the axis serving as support in standard cylindrical bearings, which are placed on the pillars which, every certain length interval, are buried in the ground and rigidly support the mentioned bearings, therefore the securing axis, which furthermore is the rotating shaft, is always fixed in that straight line position, though it can rotate about its central imaginary axis. To that end, at one end of the physical shaft is integrally attached a gear wheel, a worm screw or a rotating pulley, which by means of an electric motor or hydraulic thruster, acting through either a direct gear or through a transmission belt or chain, forces the mirror to rotate about its longitudinal central axis, said axis having the corresponding inclination so that its reflected rays are focused on the active surface of the longitudinal receiver. The invention includes specific novel aspects concerning the perpendicular section profile of each mirror according to its position in relation to the receiver.

Solar astronomy charts allow knowing the location of the sun at all times, so it is possible to precisely determine within natural solar tolerances the inclination of each mirror so that its reflected rays strike the receiver, the longitudinal axis of which is parallel to the group of axes of the mirrors.

The precision of the inclination given by the rotation of each mirror can be assured by means of solar collimators and the aforementioned uncertainties also affecting collimators refer to the fact that the sun is seen from the Earth's surface as a disk with uniform radiation intensity (as its surface radiation is given off in a virtually diffuse manner) with an apparent diameter width of 32 sexagesimal minutes, as stated above.

With the mentioned background of planar or slightly curved mirrors arranged parallel to one another, a new invention configuring a mirror-receiver coupled geometric array is presented which complies with very specific specifications as to the size and location of the mirrors with respect to the size and location of the receiver. The set of requirements determines a unique configuration of a highly concentrating solar device.

For obvious astronomical reasons, this geometric array for concentrating solar radiation has two different basic assemblies: one according to the meridian in which the longitudinal axes of the mirrors and of the receiver run North-South; and another one according to the local parallel, in which the longitudinal axes of the mirrors and of the receiver run East-West; other assemblies also being possible, the longitudinal axes running in any direction in the local horizontal plane.

For the purpose of suitably explaining the invention, a brief description of radiation reflection is appropriate. Firstly, when the reflection occurs, an angle is formed between the striking ray and the reflected ray such that the bisector of said angle coincides with the line normal to the plane tangent to the reflecting surface in the striking point. Since this surface has the same perpendicular section for each of the mirrors used in the invention along the entire mirror, what must be determined are the features that perpendicular section must have for each mirror. In this respect it must be borne in mind that solar radiation has a three-dimensional nature and the definition of a perpendicular section, however, is only two-dimensional. To that end solar radiation is projected in what is referred to as the optical plane or working plane, which is a plane perpendicular to the longitudinal axes, and therefore it transversally and perpendicularly intersects the receiver and the mirrors. Said cutting can be fixed at any point along the length of the axes. In any of the assemblies, the arrangement can be as long as desired, but transversally it must comply with the specifications established in the invention.

Another important background is the concentration of radiation by concave mirrors, of which there have been two main cases from Archimedes' times: parabolic and circular mirrors. In parabolic mirrors, all the rays propagated parallel to the axis of symmetry of the parabola will converge at the focal point of the parabola after the reflection in the parabola.

Parabolas are usually expressed in a coordinate system having their apex as the origin and the axis of symmetry as the y-axis. The x-axis is the normal to the y-axis at in said origin. The general equation is $$y = a \cdot x^2$$

where parameter "a" which has proportionality between the square of the x coordinates and the y coordinate, has a value that is exactly equal to one fourth the reverse of the focal distance, which is the distance from the apex to the focal point. Therefore, if a mirror of the kind used in this invention is given a parabolic profile such that its focal distance is equal to that which is between the mid-point of the mirror and the mid-point of the receiver, all the rays that are parallel to the axis of symmetry converge at the mid-point of the receiver. That is not the case of rays not parallel to the axis of symmetry, which is one of the main causes of performance loss in Fresnel reflection assemblies and is the motivation behind this invention, the purpose of which is to rectify that weakness in terms of a solar device.

On the other hand circular concentration can be mentioned in which the perpendicular section of the mirror is an arc of circumference. Strictly speaking, the concentration is only effective when the arc is small, measuring said smallness because the circular arc expressed in radians and the sine of said arc are virtually equal. This property goes far beyond what is necessary in the Fresnel reflection mirrors because for 10 sexagesimal degrees the value of the arc is 0.1745 and the sine of said angle is 0.1736, which are very similar. Under 3 sexagesimal degrees, the values are identical in 4 decimal figures. It will be seen in the description of the invention and in the specified embodiments that said arc does not exceed 3°, so the criterion of circular concentration of radiation is amply complied with, which states that: "A circular arc is one with a diameter defined on the mid-point of the arc, which diameter serves as an axis of symmetry. All the striking rays parallel to that axis of symmetry that are reflected by said arc on the concave face are directed towards the surrounding areas of one and the same point, or concentration focal point, which is in the axis of symmetry, right in the middle of the radius going from the center of the circle, or center of curvature, to the mid-point of the circular sector serving as a mirror; this property is no longer complied with when parallel rays move far away from the axis of symmetry because then the requirement of numeric equality between the arc and its sine is not complied with".

It can be seen that there is a considerable similarity between parabolic and circular reflection provided that the reflection is limited to the aforesaid domain. In fact, a parabola with a focal distance equal to half the radius of curvature of a circular arc will produce a reflection virtually equal to equal to the latter. Although the parabolic reflection is accurate and the circular reflection is not, the circular arc can be used to define the profile of the perpendicular section of the mirror within the limited validity interval which is chosen for this invention as it is very easy and very practical to work with circular sectors and radii of curvature.

The fundamental problem is based on the fact that given the fixed locations of the receiver and of the center of the mirror, the aforesaid property of concentrating radiation on a focal point can be used for only one position solar. For the remaining solar positions in its daytime path, which are the majority, that property does not occur. The invention precisely addresses this reality and provides such a device configuration which achieves high concentrations on the receiver based on a field of longitudinal mirrors like the classical ones in Fresnel reflection assemblies but with singular and novel specifications.

DESCRIPTION OF THE INVENTION

The invention consists of configuring a high concentrating solar device with the following elements optically connected to one another by solar radiation paths:
  a longitudinal solar radiation receiver supported in height by pillars or structural frames, generally transversely braced, with an aboveground height in accordance with the reflection of the radiation reflected by the mirrors, and having an active surface or face which is where the concentrated radiation strikes, said active face transversally having a certain inclination on the ground and the receiver further being formed by elements that will depend on the final purpose of the power plant in question, which can be for photovoltaic generation, the activation of photochemical processes or the heating of a thermal fluid to reach high temperatures;
  an array of longitudinal mirrors, the longitudinal axis of symmetry of each mirror being parallel to the longitudinal axis of the receiver, the specular surface being placed in a structure made up of a rigid longitudinal axis that coincides with the longitudinal axis of symmetry of the specular surface and serves as a fundamental support for the latter, further having small rigid crosspieces integral with said physical axis, which is rotational, about which the specular surface rotates, the rotation being produced by the action of any gear or belt transmission mechanism located at one end of the axis or in an intermediate position along its length, which can be activated by either an electric motor or by a hydrodynamic piston; and the physical axis being supported inside cylindrical bearings the outer part of which is fixed and integral with the right supporting pillars or bases for the mirror and the structure thereof, which are buried in the corresponding foundations in the ground, there being a bearing-pillar assembly every certain length interval, that arrangement coinciding with a small interruption of the specular surface if the latter is chosen to thus rotate along the entire circumference, which is unnecessary for focusing the radiation but can be of interest for the purposes of cleaning and reducing the dynamic load of the wind against the mirror; or the specular surface remaining continuous above the support structure if complete circumference rotation is not chosen;
  the mirrors having a concave surface towards their reflecting side, said concavity being produced for each mirror with a circular profile with a radius of curvature specifically established for each mirror, said radius of curvature of a mirror in the basic or reference specification being twice the distance from the central point of the mirror to the central point of the active surface of the receiver;
  and the mirrors being able to be made up of two different parts on each side of the central line, both parts having a circular concavity but with different radii of curvature in the most precise assemblies, taking into account the drifts produced in the reflections of the rays when the mirrors are moved from the reference position, the radii of curvature are selected in a range of values between twice the distance from the central point of the mirror to the central point of the active surface of the receiver, and that value is increased by 20%.

In a solar power plant there can be a plurality of these receiver-mirror arrays parallel to one another. They could have the same or different lengths according to the relief of the terrain, and these arrays could be hydraulically connected to one another through the heat transfer fluid circuit, either in series or in parallel, depending on the thermal hydraulic design which is to be followed in each power plant, although the reference assembly is a parallel hydraulic connection, taking the fluid from the pipe coming from the power block with the relatively cold fluid, and sending the fluid to the return pipe to said block once it is heated.

The invention contains a complete set of requirements for univocally determining the geometric characteristics of the elements of the device depending on the optical relationships established between them, and they specifically relate to the height at which the receiver is located, the width of the active face of the receiver and its inclination, as well as to the position of successive mirrors across the solar park, the width of the mirrors and their transverse radius of curvature, plus the requirement of focusing each mirror on the sun at all times.

The invention can preferably be made in two geographic configurations: according to the local meridian, or North-South, and according to the local latitude, or East-West.

For the description and application of the invention, an optical or working plane, which is a plane perpendicular to the longitudinal axes, is used and therefore transversally and perpendicularly intersects the receiver and the mirrors. Said cutting can be fixed at any point along the length of the axes.

The corresponding working plane is used to specify therein the transverse inclination of the mirror, the longitudinal axis of symmetry of which will cut the mentioned plane at a point which is designated the center of the segment representing the mirror in question in the design. The path from that point to the central point of the active surface of the receiver, which is the central or mid-point of the segment formed by the cutting of said active surface with the working plane, is defined.

Angles formed by some lines (generally associated with rays and lines of sight from one point to another) with the x-axis are defined in this working plane, and these angles are measured according to the usual plane trigonometry standard, rotating counterclockwise or in a levorotatory direction from the positive x-axis. This works when the general coordinate system of a field of mirrors is used, the vertical line passing through the central point of the active surface of the receiver of that field being the y-axis and the perpendicular to the previous passing through the central point of the mirror closest to the receiver being the x-axis. This trigonometric criterion is also applied when dealing with the local coordinate system associated with each mirror, in that case the y-axis being the line normal to the mirror at its central point and the x-axis being the perpendicular to the previous axis in the center of the mirror, which is the coordinate origin. For each mirror there is a reference situation in which the y-axis, or normal at the central point, coincides with the line going from this point to the center of the active face of the receiver.

The operation of the invention incorporates a method of determining the angle of rotation or inclination that each mirror must have at all times with respect to the general coordinate system of the field, consisting of the central ray of the solar beam striking the central point of the mirror in question, which is the central point of its perpendicular section, as seen in the optical or working plane, is reflected on the central point of the active face or surface of the corresponding receiver, which implies that the normal to the mirror at its central point coincides with the bisector of the angle forming in the optical plane the projection on this plane of the mentioned striking ray and the line joining the central point of that mirror with the central point of the receiver, this last line being referred to as the reference line of the mirror.

To that end, the angle of sight of this line joining the central point of the mirror in question with the central point of the receiver is defined as the angle formed by this line with respect to the positive x-axis of the general coordinate system, which is parallel to the horizontal of the location. All the lines have their corresponding angle of sight in the general coordinate system of the device with respect to the x-axis, always considered in a levorotatory direction from the positive semi x-axis. Particularly, the central rays of solar radiation beams have an angle of incidence on the horizontal that will be given by the astronomical data for each moment, although said angle of incidence must be defined in the working plane and therefore corresponds to the projection of the solar radiation on this plane. The inclination requirement for each mirror is that the normal to the mirror at its central point has an angle of sight that is the half-sum of the angle of sight of the reference line of the mirror and the angle of incidence of solar radiation, all in the expression or projection thereof in the working plane.

When assembled according to the meridian, since the arrangement is symmetrical with respect to the double receiver, the centers of the mirrors, which are the centers of rotation in the working plane, are preferably located in a horizontal line, i.e., all the mirrors are at the same height as they will receive solar radiation from the east during some hours and from the west at other hours.

When assembled according to the parallel, the effective illumination is always from the south in the northern hemisphere and from the north in the southern hemisphere, except in tropical areas and except very early in the morning and in the evening when the sun is more to the north than the local parallel in the northern hemisphere at the end of spring and beginning of summer, but then its illumination is not thermally effective. This asymmetry of illumination means that for the field of mirrors north of the receiver in the northern hemisphere, the height of the centers of the mirrors in the working plane and therefore in local altitude can gradually increase as the mirrors are further from the receiver to have better reflectivity of the radiation thereon, with the sole limitation of the shadow that the last mirrors would cast on the following receiver-mirror array that can be found more to the north of the array being considered in the northern hemisphere. An identical situation occurs in the southern hemisphere with respect to the equator, and the increase in said height is applied to the fields south of the receiver.

The width of the active surface of the receiver, referred to as R, is determined depending on the natural aperture of solar radiation, 0.0093 radians, and on the straight line distance from the central point of the last mirror of the field to the central point of the receiver. For the purpose of the width R very roughly coinciding with the transverse aperture of a beam of radiation reflected from any one point of the furthest mirror, the value of the width R is set at 1% of said distance from the central point of the last mirror of the field to the central point of the receiver. That 1% is used as a reference value for said width, being able to choose higher values, up to 2%, or lower values, down to 0.2%, without violating the principle of the invention, although the performance of the power plant is different from that which can be obtained with the reference value which has a performance that is always close to being optimal. If it is considered that a receiver surface must be added to include possible deviations of the beam due to imperfections in the mirrors, the width is increased up to 2%. In contrast, if only the central part of the beam is to be received to have very high radiation intensity, the width of the receiver is reduced to 0.2%.

The width of each mirror is determined as the distance between its ends in the x-axis of the coordinate system of each mirror, and its determination is explained later as it requires studying the lateral displacement or drift of the reflected rays. E refers to the generic width of a mirror which can be the same for all mirrors or specific for each one according to how the invention is carried out.

Another crucial determination is the height at which the receiver is placed and its inclination with respect to the horizontal, which depends on the distance to the furthest mirror of the field in question. For the sake of having good transparency for crossing the cover of the receiver, the reflected beams should be as perpendicular as possible. This leads to placing the receiver at a certain height, indirect requirements being provided to that end, as the inclination of the active face of the receiver is defined in that it must be normal to the bisector of the field from the central point of the active face of the receiver, said bisector being the bisector of the angle that is formed with the lines going from the central point of the active face of the receiver to the central point of the mirror closest to the receiver, and to the central point of the furthest mirror. As an additional requirement, the value of the acute angle formed by the line joining the central point of the furthest mirror of the field with the central point of the active surface of the receiver with the horizontal is selected in a range of values between 10° and 80°, with a reference value of 45°.

An almost complete adjacency between consecutive mirrors is chosen to determine the spacing between consecutive mirrors for the purpose of obtaining a truly high concentration factor. This causes shadows and interferences between mirrors but assures that the entire surface available for reflecting the solar radiation on the receiver is used effectively within the limits imposed on the field of mirrors. The almost complete adjacency means that no more space than that allowed by the assembly tolerances, standing at a value selected between 0.1% and 5% the width of the mirrors, is left between consecutive mirrors. To clean or repair the mirrors, they are located with an angle of rotation taking them to the vertical, or close to it, which can allow access of personnel or a cleaning robot.

The length of the mirrors must be at least the length of the receiver, but a somewhat longer length is recommended, with an added length on the side from where the solar radiation will be received during efficient sunshine hours, which is the south in the northern hemisphere for assemblies according to the meridian, the mirrors likewise being able to be cut on the north side, and vice versa in the southern hemisphere. For assemblies according to the parallel or east-west orientation, the mirrors must be longer on both sides with respect to the length of the receiver. In both assemblies, the added length is equal to the height of the mid-point of the active face of the receiver divided by the tangent of an angle of inclination of solar radiation selected in the design between 20 sexagesimal degrees and 90 sexagesimal degrees.

The "Embodiments of the Invention" section specifies a determination of the ideal width of each mirror, although an equal width can be set for all mirrors for the sake of assembly simplicity. Both are determined depending on the drift experienced by the rays reflected from the end points of each mirror; said drift being the lateral displacement of the ray reflected from each end, and such drift being caused by the rotation of the mirror in order to be oriented towards the sun.

To mark the end of the description of the invention, it is important to point out that insofar as a high concentration device, the invention is applicable to any purpose as the receiver can be configured with devices selected from a thermal type, photovoltaic type, or another type of phenomena involving physicochemical or molecular transformations due to the action of radiation.

DESCRIPTION OF THE DRAWINGS

The drawing are generally not to scale as the relative sizes of the elements are very disparate; for example, the receiver and the mirrors will be considerably wider than they are long and also far below the height at which the receiver is supported.

EMBODIMENT OF THE INVENTION

Figure 1:
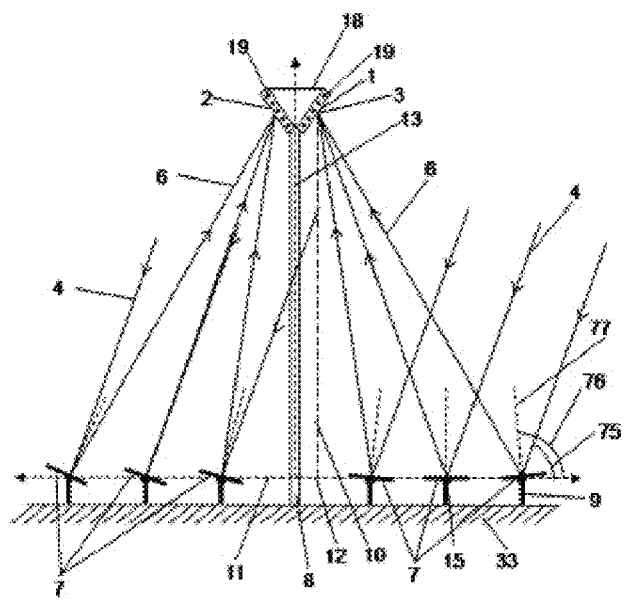
FIG. 1 shows a diagram in perpendicular section of the solar device, corresponding to an assembly with a double reflector or dual assembly.

The relevant elements of the invention are listed below to aid in understanding the drawings and embodiments thereof:

1. Solar radiation receiver, the transverse width of its active face where radiation strikes and is absorbed is R. It can take various positions depending on if the assembly is according to the meridian or according to the parallel, but its properties are generic, and it is assembled on pillars or columns supporting it at a considerable height above the ground. The receiver can be formed by various elements according to its purposes. It can be a group of photovoltaic cells or a bundle of radiation absorption tubes inside which a heat transfer fluid circulates; or it can have any other arrangement to carry out the function of capturing energy reflected by the field of mirrors. FIG. 1 shows two symmetrically arranged receivers in a double or dual assembly.

2. Active surface or face of the receiver (1), the transverse width of which is R, where concentrated solar radiation is absorbed.

3. Central point of the segment representing the active face (2) of the receiver (1) in the working plane defined in the invention.

4. Direct solar radiation.

5. Longitudinal mirror reflecting the source solar radiation on the receiver (1) and which is closest to the receiver.

6. Solar radiation reflected by the mirrors (7).

7. Generic mirror reflecting the solar radiation (4) on the receiver (1).

There is a plurality of parallel mirrors in the array reflecting radiation on one and the same receiver (1).

8. High columns or pillars maintaining the radiation receiver (1) and all its internal elements at their height and in position.

9. Low pillars maintaining the axes of the mirrors generically depicted as (7) at their height and in position.

10. Y-axis of the working plane for a specific field of mirrors, and it is the vertical axis passing through the central point (3) of the active face (2) of the receiver (1).

11. X-axis of the working plane, which is the horizontal line passing through the central point (88) of the mirror (5) closest to the receiver (1), and the y-axis (10) is therefore perpendicular.

12. Point of origin which is the intersection between the axes (10) and (11).

13. Vertical axis of symmetry in dual assemblies different from axis (10), which is the y-axis in the reference coordinate system.

14. Longitudinal axis of a generic mirror (7) about which it rotates to acquire the transverse inclination necessary for solar focusing the sun.

15. Rotating junction of the pillar (9) with the rotating shaft (14) of the generic mirror (7) as the result of a bearing.

16. Securing part for firmly securing the receiver (1) to the column (8) in the upper part, allowing the receiver to expand vertically, maintaining its angle of inclination. It can have various configurations.

17. Transverse bracing cables for bracing the pillars or columns (8).

18. Upper crosspiece for stiffening receivers (1) in double or dual assemblies.

19. Internal elements of the receiver (1). They can be a group of longitudinal tubes within which the heat transfer fluid carrying circulates, carrying most of the heat deposited by the radiation on the active surface (2) of the receiver (1), or it can be the group of photovoltaic cells and cables in the case of a photovoltaic application.

20. Center of the circumference of which the mirror with a circular arc (31) is part.

21. Central point of the mirror with a circular arc (31).

22. Radius joining points (20) and (21).

23. Solar ray parallel to the line (22).

24. Point of the mirror (31) where the ray (23) strikes.

25. Radius going from the center (20) to the point (24).

26. Angle formed by the ray (23) and the radius (25) at their common point (24). The radius (25) is the normal at the reflection point, and therefore the reflected ray (27) will form an equal angle with the radius (25).

27. Ray reflected from the point (24) by the incidence of the ray (23).

28. Point of intersection of the ray (27) with the radius (22).

29. Angle formed by the ray (27) with the radius (22) at their intersection.

30. Mid-point of the radius (25).

31. Mirror the reflective surface of which is a circular arc.

32. Mirror furthest from the receiver used to determine the width R of the active face (2) of the receiver (1).

33. Ground and foundation.

34. Point of the active face (2) of the receiver (1) where the ray (48) reflected from the end (36) strikes when the mirror is not in its reference position, but rather in another rotated position in which the right end of the mirror (generic mirror, 7) occupies position (36a) (see FIG. 4).

35. Central point of a generic mirror, (7).

Figure 4:
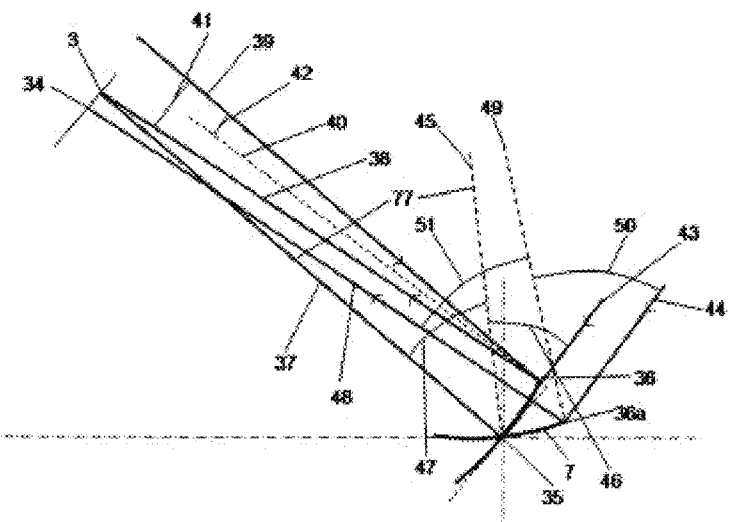
FIG. 4 shows the diagram of a mirror focused on the central point of the receiver in two positions, the reference position and any other generic position.

36. Right end of the mirror (generic mirror, 7) when it is in the reference position. FIG. 4 also shows point (36a), which is occupied by the same end point when the mirror rotates to another position to focus on the sun at another time.

37. Line joining the central point of the mirror (7) with the central point (3) of the active face (2) of the receiver (1). It is the normal at the mid-point in the reference position of the mirror.

38. Ray going from the right end (36) to the central point (3) of the active face (2) of the receiver (1) when the mirror in question is in the reference position.

39. Ray striking the end (36) parallel to the line (37) and reflected in that point, giving rise to the ray (38).

40. Bisector of the angle of reflection of the ray (39) to (38), which is the normal to the mirror at its end.

41. Angle of reflection of the ray (39) to (38).

42. Semi-angle of reflection of the ray (39) to (38) comprised between the ray (39) and the bisector (40), and it is in turn the angle between normals (37) and (40).

43. Solar ray striking at (35), coming from the sun when it is in any one position other than the reference position.

44. Solar ray striking at end (36) (in position 36a), coming from the sun when it is in any one position other than the reference (such as the position marked by end 36a).

45. Normal to the mirror (7) at its central point, the rotation of which is done to focus on the sun, such that this normal is the bisector between the incident ray (43) and the line (37) joining the central point of the mirror (7) with the central point (3) of the active face (2) of the receiver (1).

46. Semi-angle of reflection between the ray (43) and the normal-bisector (45).

47. Semi-angle of reflection between the line (37) and the normal-bisector (45).

48. Ray reflected from end (36a) by the incidence of ray (44), and striking in the active face (2) of the receiver (1) in point (34). The ray (48) is parallel to ray (38), as the angular difference between the normal to the mirror at its central point and at its end is always maintained by the configuration characteristic of the mirror, which is rotated so that the ray reflected in its center continues to follow line (37), that reflection coming from ray (43) to which ray (44) is parallel. That angular difference between normals means that the semi-angle (50) is greater than (46) by an amount that is equal to the semi-angle (42), which is what characterizes the difference of slopes between the normals at the central point and at the end.

49. Reflection bisector at end (36a) normal to the mirror (7) at the right end.

50. Semi-angle of reflection between the ray (44) and the normal-bisector (49).

51. Semi-angle of reflection between the normal-bisector (49) and the ray (48).

52. Horizontal line of the location (see FIG. 5).

53. Angle of rotation of the normal to the mirror at its central point, from the reference position to the focusing position for focusing on the sun during actual sunrise (54).

54. Ray of the actual sunrise.

55. Ray of the actual sunset.

56. Left end point of the generic mirror (7).

57. Line parallel to (37) from the right end point (36).

58. Angle Avp of the right end formed between line (57) and ray (38) coming from point (36).

59. Angle Avp of the left end which is numerically equal but has the opposite sign to (58) when the mirror is symmetrical and is formed by ray (60) and line (61).

60. Ray from the left end (56) going to the center (3) of the active face (2) of the receiver (1) in the reference position of the mirror (7).

61. Line parallel to (37) from the left end point (56).

62. Reference position of the generic mirror (7). The x-axis coincides with this position, which resembles a line in the approach used in the drawing, although the mirror has its own concavity according to the radius of curvature corresponding to it, equal to twice the distance from the central point of the receiver to the center of the mirror (35), which is in turn the origin of this coordinate system, the y-axis of which is line (37).

63. Position of the generic mirror (7) during actual sunrise.

64. Position of the generic mirror (7) during actual sunset.

65. Position of the right end of the mirror during actual sunrise.

66. Ray reflected from the right end in its position (65) during actual sunrise, one ray being parallel to ray (38), and its displacement measured on the x-axis of the specific system coordinate of the mirror being the drift of ray from that end point.

67. Position of the right end of the mirror during actual sunset.

68. Ray reflected from the right end in its position (67) during actual sunset.

69. Position of the left end of the mirror during actual sunrise.

70. Ray reflected from the left end in its position (69).

71. Position of the left end of the mirror during actual sunset.

72. Ray reflected from the left end in its position (71), during actual sunset.

73. Bisector at sunrise, which coincides with the normal at the central point, in sunrise.

74. Bisector at sunset, which coincides with the normal at the central point, in sunset.

75. Angle of sight of the incident solar rays (4).

76. Angle of sight of the normal to the mirror at its central point. It is an essential element for the focus of each mirror.

77. Normal to the mirror (7) at its central point (35).

Figure 7:
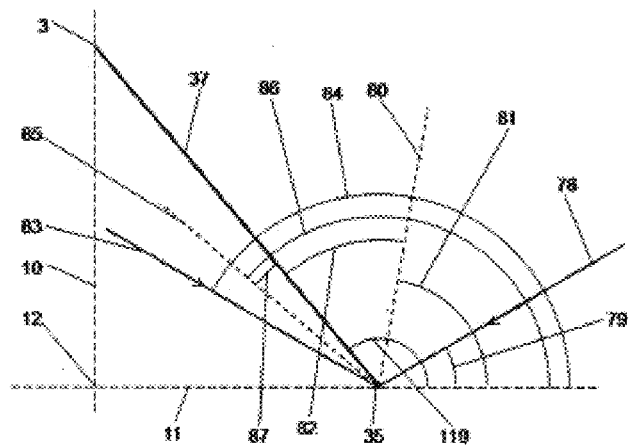
FIG. 7 shows the representative angles of the rotation of a mirror while following the daytime path in an assembly according to the meridian.

78. Line of the rays during actual sunrise (FIG. 7).

79. Angle of the line of the rays during actual sunrise.

80. Bisector normal to the central point of the mirror during sunrise.

81. Angle of the bisector (80).

82. Angular rotation of the mirror from the reference position to the focusing position for focusing on the sunrise. In this case it is angle Agm.

83. Line of the rays during actual sunset.

84. Angle of the line of the rays during actual sunset.

85. Bisector normal to the central point of the mirror during sunset.

86. Angle of the bisector (85).

87. Angular rotation of the mirror from the reference position to the focusing position for focusing on the sunset.

88. Central point of the mirror (5) closest to the receiver (1).

89. Central point of the mirror (32) furthest from the receiver (1).

90. Angle of inclination of the active face (2) of the receiver (1) with respect to the horizontal.

91. Bisector of the field of mirrors, which is the bisector of the triangle formed by lines (120) and (121) going respectively from the central point (3) of the surface (2) of the receiver (1) to the central point (88) of the closest mirror (5), and from the central point (3) to the central point (89) of the furthest mirror (32).

92. Projection of the rays during actual sunrise and sunset situations when assembled according to the parallel, which in this case have a coinciding projection in the working plane.

93. Ray of the maximum height situation reached by the sun in the working plane on a specific day when assembled according to the parallel.

94. Reflection bisector in sunrise and sunset situations, coinciding with the normal to the central point of the mirror in question, in those situations.

95. Reflection bisector in the situation of maximum height of the sun, coinciding with the normal to the central point of the mirror in question in that situation.

Figure 6:
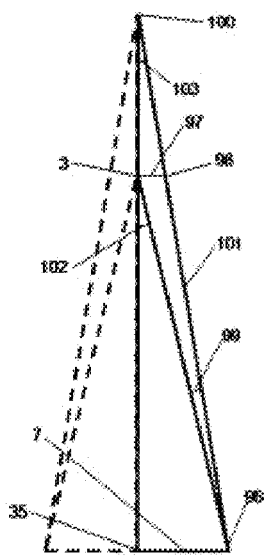
FIG. 6 shows the geometric diagram of correcting the effect of drift of rays reflected from a mirror.

96. Right end of a generic mirror (7) in which the correction of the drift corresponding to the sun when it is at its zenith is applied when assembled according to the meridian (FIG. 6).

97. Value of the drift to be corrected in the ray reflected from (96).

98. Point of the active surface of the collector where the ray reflected from 96 strikes after correcting the drift.

99. Angle Avx corresponding to the correction of the drift.

100. Cutoff point on the y-axis of the ray (101) reflected from (96). It is a virtual point, a virtual prolongation of the ray (101), which is physically interrupted at point (98).

101. Ray reflected from (96) in the reference situation of the mirror.

102. Angle with which the semi-mirror going from (35) to (96) is subtended from the central point (3) of the active surface (2) of the receiver (1).

103. Angle with which the semi-mirror going from (35) to (96) is subtended from the point (100).

104. Radius going from the center of the circle (20) to the right end of the originally circular mirror (31). See FIG. 0.

105. Radius going from the center of the circle (20), to the left end of the originally circular mirror (31).

106. Central angle in (20) of the arc of the mirror (31).

107. Angle resulting from dividing the value of (106) by the number of polygonal faces in which the arc of the mirror (31) will be approximated.

108. Radius on the right forming angle (107) together with (105).

109. Bisector of the angle (107).

110. Segment the upper face of which is specular, which is perpendicular to the bisector (109) at its mid-point.

111. Left end point of the segment (110).

112. Right end point of the segment (110).

113. Support base of the segment (110), with the inclination of its upper face parallel to the segment (110).

114. Semi-longitudinal securing axis of the mirror (31), and in turn coinciding, in the vertical supports of the mirror with the lower half of the complete axis (14), which is supported and rotates in the bearings of the low pillars (9).

115. Angle Aelev, which is the angle elevation over the horizontal of the line going from the center (89) of the last mirror of the field to the central point (3) of the receiver (1) (it is not counted from the positive x-axis like the other angles).

116. Distance, Dmax, from the center (89) of the last mirror of the field to the central point (3) of the receiver (1).

117. Length, L, of the field of mirrors in the transverse direction, measured as the distance between the centers (88) and (89) of the closest mirror (5) and furthest mirror (32) with respect to the receiver (1), respectively.

118. Height, H, of the central point (3) of the receiver (1) above the point of origin (12).

119. Angle of position of the line joining the central point of the mirror in question with the central point of the receiver, and the mirror coinciding with the normal at its central point in the reference position, being an angle in relation to the positive x-axis.

120. Line joining point (3) with (88).

121. Line joining point (3) with (89).

Taking into account the importance of several angles for the specification of the invention, such angles are described below, consigning the number identifying them, except a case corresponding to astronomical data. In several cases, the angles are angles of site of a line and in such case are measured in a levorotatory direction from the positive x-axis of the system in which they are defined, which can be the general system of the field, or the specific system of a mirror:

Asol (75) angle of sight of the projection of the rays of sunlight (4) on the working plane.

Aer (119) angle of sight of the line joining the central point of a mirror with the central point of the receiver. Therefore there is one Aer for each mirror.

Anor (76) angle of sight of the normal to a mirror at its central point.

Agm, maximum angle of rotation of the normal to a mirror at its central point as it rotates for focusing on the sun with respect to the reference position of the mirror. It depends on each mirror and on the astronomical situation. It is element (82) in FIG. 7 and (53) in FIG. 5.

Figure 5:
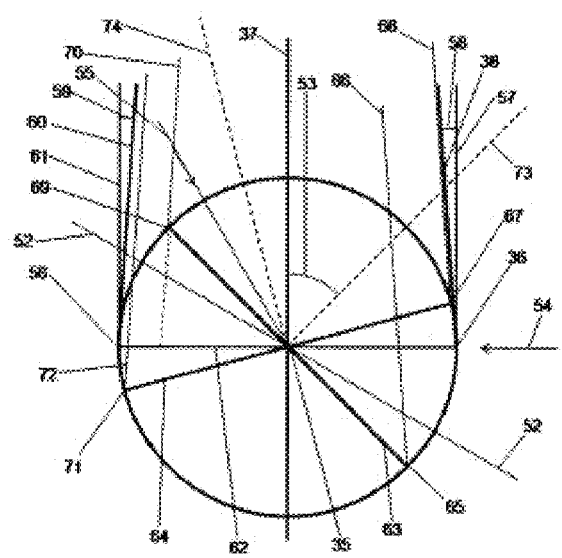
FIG. 5 schematically shows the perpendicular section of a mirror rotating about its central point in an assembly according to the meridian from the position considered effective sunrise to the position considered effective sunset, passing through the reference position, indicating the drift of the rays reflected from each end.

Avp, angle of inclination of the ray coming out of one end of the mirror in the focusing situation in the reference position with respect to the normal to the mirror at its central point. In FIG. 5 it is (58) for the right end and (59) for the left end.

Acf, which is the complementary angle of the latitude of the location plus a value selected between 1° and 23°, 20° being used as a reference value, and not being able to exceed 90°, which is the maximum limit of its value.

Aelev (115) acute angle formed by the line going from the central point (89) of the mirror furthest from the central point (3) of the receiver, and the closest semi x-axis.

Avx (99) angle for correcting drift (FIG. 6).

Ace (102) angle subtending a semi-arc of the mirror (FIG. 6)

Acn (103) angle subtending a semi-arc of the mirror from the center corrected by drift (FIG. 6).

Figure 3:
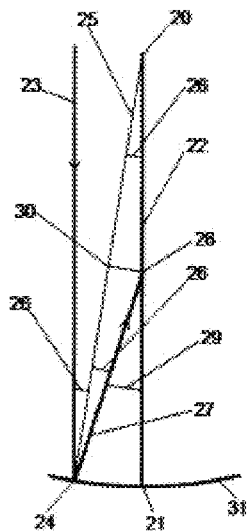
FIG. 3 shows a cross-section of the reflection of rays on a circular arc, identifying the focal area where the reflected radiation is concentrated.

Arc (26) angle formed by an incident ray and the radius of the circumference at the point where it strikes (FIG. 3).

Aic (29) angle of incidence of the reflected ray in a mirror with a circular arc on the axis of symmetry (FIG. 3).

Agc, half the value of the angle formed by the line joining the central point of a mirror with the central point of the receiver and the vertical.

Figure 10:
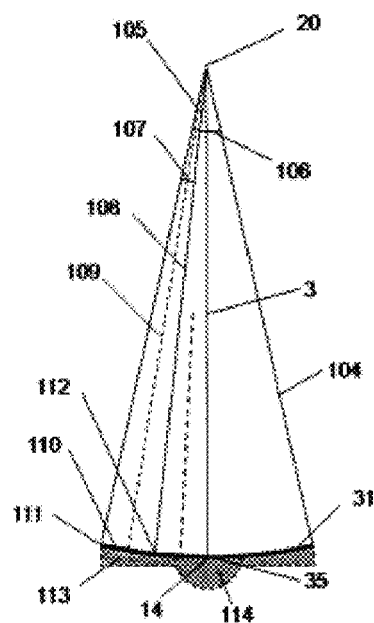
FIG. 10 shows the diagram of a polygonal mirror, inscribed or circumscribed in the circular arc originally selected.

Ate (106) angle with its vertex in the center of the arc of the mirror, whereby the entire circular mirror in question is encompassed (FIG. 10)

Asp (107) angle with its vertex in the center of the arc of the mirror, which is Ate divided by the number of polygonal sides with which the entire circular mirror in question with be covered (FIG. 10)

It is also appropriate to list a set of capital letters having particular relevance in the description of the invention and in carrying out said invention:

R is the transverse width of the active face of the receiver (1).

E is the generic width of a mirror which can be the same for all of them or specific for each mirror, depending on how the invention is carried out.

D is the distance from the central point of a mirror to the central point of the active face of the receiver.

Dmax (element 116) is the maximum value of D corresponding to the last mirror of the field (the mirror furthest from the receiver).

L (element 117) is the length of the field of mirrors in the transverse direction.

H (element 118) is the height of the central point (3) of the receiver (1) above the point of origin (12).

P is the quotient between the maximum drift of rays allowed in the mirrors and the value of the width R of the active surface (2) of the receiver (1).

To carry out this invention, an array of elongated rectangular mirrors (7) which can be made of any reflective material is arranged, the mirrors having a lower structural frame to maintain their shape and to be able to be rotated about their longitudinal securing axis (14) coinciding with axis of symmetry of the specular surface. These mirrors are located on low pillars (9) provided at their upper abutment with a clamp gripping a bearing (15) which in turn holds the structural rotating shaft (14) of the mirror (7). Several mirrors having these characteristics are assembled in parallel; in the basic version of the invention they all have the same transverse width, which is defined depending on the width of the active face (2) of the receiver (1), which is 1% of the distance from the center of the furthest mirror (89) to the central point (3) of the receiver in question, although this reference value can be changed, selecting another percentage of the same order of magnitude between 0.2% and 2%. It should be borne in mind that 1% of the said distance is fixed depending on the natural aperture of solar radiation, 0.0093 radians (equivalent to 1/107 radians). If it is considered that a receiver surface must be added to include possible deviations of the beam due to imperfections in the mirrors, the width is increased up to 2%. In contrast, if only the central part of the beam is to be received to have very high radiation intensity, the width of the receiver is reduced to 0.2%.

Each mirror has a concave specular surface towards the receiver, characterized in that it is a circular arc with a radius of curvature that is twice the distance from the central point of said arc to the central point (3) of the active surface of the receiver in the basic version, although the invention includes other alternatives. The specific width of each mirror, or the equal width for all of them, are determined after having algebraically characterized the drift of the reflected rays upon rotating each mirror for focusing on the sun.

Figure 2:
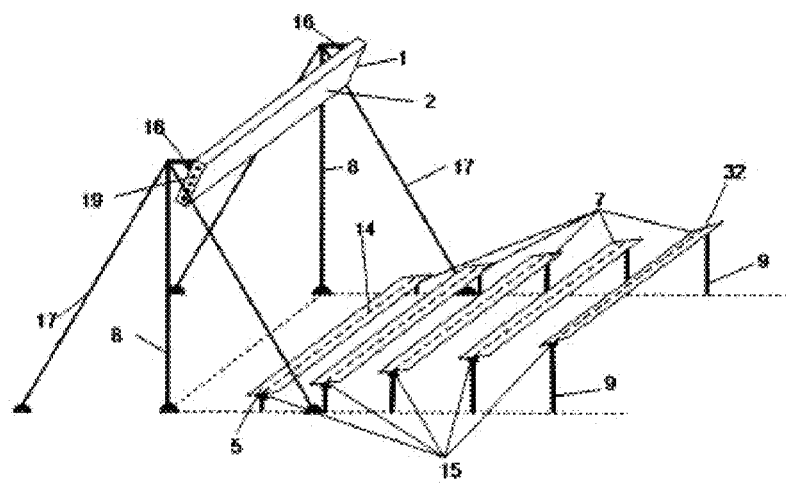
FIG. 2 shows the three-dimensional diagram of a receiver-mirror array when assembled according to the parallel, with an arrangement north of the parallel in the northern hemisphere.

The invention is completed by providing a group of high pillars or columns (8) forming a longitudinal line like that shown in FIGS. 1 and 2, the receiver (1) being supported in said line of pillars, generally in a dual version, although in some east-west assemblies a single receiver can be chosen, as in FIG. 2. The array of longitudinal mirrors (7) supported on their solid rotating shafts (14), in turn supported by lines of low pillars (9) which intersect the latter in parts (15), is arranged parallel to that line. Taking into account that the arrangement is uniform in the longitudinal direction and can have the desired length, the description of the invention and its quantitative requirements are established in the corresponding working plane, which is always normal to the longitudinal assembly axes, which are parallel to one another.

The most important dimension to be determined in the receiver (1) is the transverse width of its active surface (2), which must be proportional to the solar park's capacity to concentrate the source radiation (4), as a result of the reflected radiation (6), striking the surface (2).

A field of mirrors with north-south orientation in which the distance of the central point of the furthest mirror from the central point of the receiver is 100 m can be cited as illustrative data, therefore the width of the active surface of the receiver is 1 m, and that same value is used for the width of the mirrors, this matter being dealt with in detail because the mirrors are slightly concave. As an example, a mirror the central point of which is 50 m from the central point of the receiver (1) has a circular arc 100 m in radius as its surface profile. This means that the value of said arc is of 1/100 radians, which is the equivalent to 0.5729°, or 34.3'.

When measured in the coordinate system of the mirror itself, the right end of the mirror has 0.5 m as its x coordinate and 1.25 mm as its y coordinate. The slope of the mirror at that point is the tangent of the semi-angle of aperture of the arc of the mirror, i.e., 1/200 radians, which is 0.005. Data for the left end are logically symmetrical, and it must be taken into account that the relative inclinations or slopes of the normals at the ends, or at any other point of the arc, with respect to the normal at the central point will always be maintained at that value, regardless of the rotation of the mirror, which is a fundamental property for understanding the phenomenon of drift of the radiation reflected from the mirror when said mirror is not in the reference position.

The concentration of radiation on the active surface (2) of the receiver (1) depends on the reflection in the cylindrical mirrors with a circular perpendicular section, the fundamental characteristics of which are important to be determined with the aid of FIG. 3. A beam of parallel rays (to which the natural aperture of sunlight would later have to be superimposed), which in this case are also parallel to the line of focus, which is the radius (22), strikes mirror (31), which is a circular arc. Therefore, the generic ray (23) parallel to the radius (22) strikes point (24) of the mirror (31), forming an angle Arc (26) with the radius (25) which is normal to the mirror at that point, so the ray is reflected in path (27), forming the same angle Arc on the other side with the radius (25). That ray intersects the central radius (22) at point (28) and with an angle Aic (29) that is twice Arc. A triangle is thus formed between points (20), (24) and (28), from which angle the position of the latter in radius (22) can be obtained. If the sine theorem is applied to said triangle, which is an isosceles triangle, two lengths must be used: radius "O", going from (20) to (24); and side "I", going from (20) to (28); therefore I/O=sine Arc/sine(180°−Aic)

where it has been taken into account that Aic is the complementary angle of the obtuse angle of the triangle in question; but in turn sine (180°−Aic)=sine Aic so I/O=sine Arc/sine Aic and if the equality approximation between the sine and the arc is valid I/O=Arc/Aic=½

FIG. 3, which is not to scale as its width should be one one-hundredth its height, obviously does not comply with the approximation, but in the practical cases sought it does comply.

Each mirror is made to follow the same rotation specification pattern to provide associated focus on the sun of the invention, and it is done using the normal (77) to the mirror (7) at its central point (35) as a tool. The mirror is rotated until this normal coincides with the bisector of the angle formed by the central ray of the solar beam striking the central point of the mirror and the line joining said central point with the central point of the active surface of the receiver, all expressed in the projection in the optical or working plane (as indicated in FIG. 4 for two different positions of the mirror). The mirror rotates as the sun moves along its daytime path from a position of the sun referred to as actual sunrise, and it is after this position that the radiation received is relevant for practical purposes, and it continues until the actual sunset, when those practical effects disappear.

The effects of that rotation of the mirror are demonstrated with the aid of FIG. 4. Said figure shows generic mirror (7) in two positions, the reference position identified because its right end point is (36), and any other position in which the end has been rotated to point (36a). Its central point (35) remains fixed and the mirror rotates around it, which is evident at its right end.

In the reference position, the mirror receives radiation in the direction going from the center (3) of the receiver (1) to the center of the mirror (35), which is somewhat paradoxical because at least the central part of the mirror would be in the shadow cast by the receiver itself, but this situation is common in solar collectors, and particularly in parabolic trough collectors, in which the central line of the mirror is always in the shadow cast by the receiver tube. In any case, this is the position in which the concentration of the radiation reflected from the generic mirror (7) on the central point (3) of the receiver (1) is set, understanding that the dispersion characteristic of the aperture of solar radiation is superimposed on said concentration.

It can be seen that the central ray (39) of the beam striking the end of the mirror (36) is also reflected, through ray (38), at the central point (3) of the receiver, (1). It is also important to bear in mind that the angle formed between the normal (37) at the central point of the mirror (35) and the normal at its end (40) will always be the same (42), regardless of the rotation experienced by the mirror. That is relevant when considering any other position of the sun, such as that depicted in the mentioned FIG. 4, where the sun strikes, in its central rays, through rays (43) and (44). The first ray, striking the central point (35) of the mirror (7), is reflected on the central point (3) of the receiver (1) because the normal (77) at the central point of the mirror (35) is the bisector (45) of the angle formed by the central ray (43) of the solar beam striking the central point (35) of the mirror and the line (37) joining said central point (35) with the central point (3) of the active surface (2) of the receiver (1). Ray (44) striking end (36a) is reflected such that the bisector of the angle of reflection is the normal (49) to the mirror at the end, which means that the reflected ray (48) is parallel to ray (38), but it starts from another different point (36a) because the mirror has rotated a specific angle from the reference position. This means that the ray (48) strikes the receiver at another point (34) of its active surface (2), and not at the central point (3) like before in the reference position. This drift experienced by the rays reflected by the mirror (7) is important because it tends to reduce the concentration intensity that is achieved in said active surface.

It is very important to point out this property of rotating mirrors whatever their geometry may be because the shape is maintained in the rotations, and the values of the angles formed by any two normals corresponding to two well-defined points of the mirror are also maintained. The property establishes that solar rays reflected from a specific point of the mirror will be parallel to one another for the various rotations of the mirror if the mirror is rotated for focusing on the solar radiation such that the ray reflected from the central point and pivot of the mirror always follows the same path (which in this case is the path going from that point to the central point of the active surface of the receiver). This geometric property does not seem to have been previously identified in any design of such solar radiation concentrating devices, which has allowed for greater precision in the specifications of this invention.

FIG. 5 shows a graphic sufficiently approximate calculation mode for calculating the amount of drift, always within the approach that the arc (in radians) and its sine coincide in value is complied with for the mirror. The figure shows the horizon line (52) which is not horizontal in the drawing because the figure is rotated, and the horizontal of the drawing is reserved for the x-axis of the coordinate system of the mirror, not of the system in general. The y-axis coincides with line (37) from the central point of the mirror to the center of the receiver in the reference position in which the mirror is represented by a horizontal line, although it is a circular arc strictly speaking, but its curvature is virtually impossible to represent to scale in this drawing because the y coordinate at the end is less than one one-thousandth of its x coordinate. The right end in the reference position is point (36), and the left end is point (56).

The mirror is rotated in a range of angles covering solar focusing from the actual sunrise to the actual sunset, and the corresponding rays that would be reflected from each end are drawn for those extreme values. The figure corresponds to an assembly according to the meridian, with an actual sunrise of 30° (ray 54) and an actual sunset of 150° (ray 55) with respect to the horizon line, which is in turn parallel to the x-axis of the general coordinate system. Since the sun is followed along 120°, the normal to the mirror at its central point, and therefore the mirror itself, rotate half that amount, i.e., 60°, due to reflection properties.

The maximum angle of rotation of the normal to the mirror at its central point with respect to the reference position of the mirror, as the normal is gradually accommodated so that the mirror can follow the solar path (which corresponds to angle (82) in FIG. 7 because the maximum rotation occurs when the mirror has to focus on the sun during actual sunrise) has been referred to as Agm.

In the reference position of the mirror, the angle formed by the normal to the mirror at its central point (35), reaching the central point (3) of the active face of the receiver, with the line joining said central point (3) of the active face of the receiver with the end of the mirror in question has been referred to as Avp. In FIG. 5, at the right end of the mirror, the angle Avp (58) is levorotatory, and therefore positive in the coordinate system defined for the mirror. If it is the left end, that angle (59) is dextrorotatory, and therefore negative in that coordinate system. In a symmetrical mirror made of a single circular arc, said angle Avp is in absolute value equal at the two ends, and in turn equal to the semi-arc of the mirror measured from its center of curvature within the approach of the arc and its sine being equal.

Drift d is measured on the x-axis of the coordinate system of the mirror, although it can then be projected on any other line. Its value is determined taking into account the projection on said axis of the semi-width E/2 of the mirror from the position of the mirror that departs from the reference the most, which in this case is the position of the actual sunrise (54). The drift is calculated depending on the aforesaid angles, in this case Agm being the angle (53) in FIG. 5 taking the normal to the mirror at its central point from the reference position (37) to the position for focusing on the sun during actual sunrise, for which purpose the normal coincides with the bisector (73).

At the left end, (56) where drifts are positive because they are of increasing x coordinates, the following equation is true $$d_i = (E/2) \cdot (1 - \cos Agm - \sin Agm \cdot \tan Avp)$$

where both Agm and Avp are dextrorotatory. In focusing on the sunrise, the position of the left end is (69), and the ray reflected from there is (70). The information is complemented with the situation of focusing on the sunset, in which the normal to the mirror at its central point (35) is the bisector (74), and the left end occupies point (71), ray (72) being the ray reflected from there.

For the right end (36), Agm is dextrorotatory but Avp is levorotatory, and in correspondence with the trigonometric relationships of FIG. 5, there is a negative drift $$d_d=(E/2)\cdot(\cos Agm-1+\sin Agm\cdot\tan Avp)$$

In focusing on the sunrise, the position of the right end is point (65) because the mirror occupies line (63), and the ray reflected from the right end is (66). In focusing on the sunset, in which the mirror occupies line (64), and the right end occupies point (67), the ray reflected from there is (68), which is very close to (38) and logically parallel to it.

As orientation of values of the drifts, a reasonable value of Agm for the assembly according to the meridian is 45°, whereas in an assembly according to the parallel, it can be 25°. In turn, the value of Avp can be 2° (0.0349 radians) and even less. It is obtained with this data that the drift of the right end, which is the greatest, is 0.159E when assembled according to the meridian and 0.055E when assembled according to the parallel.

As a reference value for the width R of the active surface of the receiver, which is a datum dominated by the aperture of solar radiation, 1% of the distance from the central point of the mirror furthest away from the central point of the receiver has been used. Since the drift must not exceed 15% of that width to prevent noticeable defocusing, it is deduced that when assembled according to the meridian, the width of the mirror has the same width as the receiver as a reference value, whereas when assembled according to the parallel, the width of the mirrors has three times the width of the receiver as a maximum reference value. If stricter drift tolerance exists, the width of the mirrors decreases, which to a certain extent makes the construction more expensive because the number of mirror securing pillars and focus and rotation systems increases. This leads to a choosing a width of mirrors equal to that of the active face of the receiver as a basic requirement for the assembly according to the meridian, and three times said width for assemblies according to the parallel.

This allows slightly reconfiguring the mirror, making it from two circular semi-arcs, one for each wing, with nil slope in the center, in its coordinate system such that the effect of drift of each side is corrected with the knowledge that in both cases the drifts are centripetal, and as the mirror moves away from the reference position, the reflected rays are displaced to the part opposite from where they start. This provides the geometric basis of a complement of the invention, in which the semi-sector of the right is focused on a point more to the right of the central point, at a distance from it, on the active surface of the receiver, selected between 10% and 90% of the maximum drift value of the right end, and in an optimal case is limited to 20% because the maximum drift value is obtained during actual sunrise, which still does not have a noticeable radiation intensity. Similarly, the semi-sector of the left is focused on the reference position, which is what the mirror is built with, at a point more to the left of the central point, at a distance from it, on the active surface of the receiver, selected between 10% and 90% of the maximum drift value of the left end, and again the optimal case is 20% of the maximum drift. In each wing, the radius of curvature of the sector is twice the distance from the central point of the mirror to the point in which the virtual prolongation of the ray reflected from each end in the reference position intersects the y-axis, and the term virtual prolongation is said because the ray has previously impacted the active surface of the receiver. Different distributions in concentrated radiation intensity on the active face of the receiver can be obtained with this fine tuning of each wing of the mirror. Nevertheless, they somewhat complicate the construction of the mirror.

A perfectly compromising solution is to make the mirror symmetrical, with a single circular arc, but giving it a radius of curvature somewhat greater than twice the distance between the central point of the mirror and the central point of the receiver. Specifically, for mirrors of assemblies according to the meridian the increase in the radius of curvature can be selected between 0 and 10%, and when assembled according to the parallel, between 0 and 5%, with respect to the reference distance, which is twice that existing between the central point of the mirror and the central point of the active surface of the receiver.

This solution can be made more precise for the assembly according to the meridian, making the reflected end rays of the solar ray central striking them strike the central point (3) of the active face of the receiver when the sun is at the zenith, in its projection in the working plane, which is the time of the greatest theoretical illumination. To that end, it is taken into account that with respect to the reference position, the mirror, and therefore the normal at its central point, must rotate an angle Agc, which is $$Agc=(90°-Aer)/2$$

Aer being the angle of sight of the line joining the central point of the mirror (35) with the central point (3) of the receiver with respect to the x-axis of the general coordinate system. The drifts at the left and right ends are, respectively $$d_l=(E/2)\cdot(1-\cos Agc-\sin Agc\cdot\tan Avp)$$

$$d_r=(E/2)\cdot(\cos Agc-1+\sin Agc\cdot\tan Avp)$$

Since Agc is less than 45°, its sine is at most equal to its cosine, but it will generally be much smaller. In turn, angle Avp is very small, and its tangent in absolute value can be approximated to the arc, which is $$Avp(radians)=(E/2)/D$$

D being the distance from the central point (35) of the mirror (7) to the central point (3) of the receiver (1), which is much greater than the width of the mirror, E. This leads to disregarding the last addend in parenthesis of the equations of drifts, giving $$d_l=(E/2)\cdot(1-\cos Agc)$$

$$d_r=(E/2)\cdot(\cos Agc-1)$$

the drifts being of the same absolute value but with opposite signs because that of the left is positive and that of the right is negative. Therefore, to correct this effect such that the rays from the ends strike the central point of the receiver when the sun is at the zenith, in the reference position the rays must strike points far from the central point (3) of the active face (2) of the receiver (1) in absolute values equal to this drift, with that of the right more to the right and that of the left more to the left.

This leads to a somewhat larger radius of curvature than that of the basic requirement of being twice the distance from the central point (35) of the mirror (7) to the central point (3) of the receiver (1), because now the rays of the ends converge at the coordinate axis at a further point (100) as explained in FIG. 6 (in a enlarged manner without being able to conserve the scale). To calculate said point (100), it is seen in the basic requirement that half the mirror is seen from the central point of the receiver with an angle Ace (102), which in radians is $$Ace=E/(2D)$$

The angular variation, or angle Avx (99), of the reflected ray (101) reflected from the right end in the new requirement with respect to the path of the basic requirement, is in radians the value of the drift to be corrected:

$$Avx=(E/(2D))\cdot(1-\cos((90°-Aer)/2))$$

Therefore the arc Acn (103) that the semi-mirror would have from the point of convergence (100) of the rays of the ends with the y-axis, in this new concavity of the mirror, is $$Acn=Ace-Avx=(E/(2D))\cdot\cos((90°-Aer)/2)$$

The new radius of curvature, RCn, of the mirror will be twice the distance from the point of convergence (100) of the rays of the ends to the central point (35) of the mirror (7), and taking into account arc Acn (103) and the semi-width E/2, the following is true $$RCn=(2\cdot D)/(\cos((90°-Aer)/2))$$

For example, if a mirror is assembled with an Aer of 135°, its new radius of curvature will be 1.08 times the basic one, which is 2D. For a mirror with an Aer of 150°, which would already be almost horizontal, the receiver would have an elevation of only 30°; the radius of curvature would increase in this requirement by a factor of 1.154.

It is important to bear in mind that the requirements are given taking into account the working plane applied to the specific circumstance that is studied and to the assembly of the system. Nevertheless, since the working plane perpendicularly intersects the longitudinal axes of the mirrors and of the receiver, the dimensions given in these requirements are exactly those that have to be applied in reality.

FIG. 7 shows an assembly according to the meridian, and only the field of mirrors on the right is shown. The mirrors on the left will be symmetrical because what occurs to one before local midday occurs to the other after midday, so it is enough to study one side of the system for which the general coordinate system is used, with its y-axis (10) being the vertical passing through the center (3) of the active face (2) of the receiver (1) and the x-axis (11) being the horizontal line passing through the center of the mirrors, which are supposedly all at an equal height in this case, although the invention can also be applied to cases with different heights, although it is not advisable in this assembly. The intersection of both axes is the origin of the system (12). For a generic mirror its center (35), which is its fixed point, and the angle Aer (119), which is what situates the normal to the mirror at its central point, is represented in the reference position. The actuation of the mirror on a typical day will be done from when the sun reaches the angle of actual sunrise (79) in which it sends rays (78), until actual sunset, marked by angle (84), with the rays arriving in a straight line (83). The normal to the mirror at its center is rotated to be the bisector at all times of the angle formed by the rays of the sun and line (37) joining the central points (35) and (3) of the mirror (7) and of the receiver (1), respectively. This leads to the bisector (80) for focusing on the sunrise, characterized by angle (81) which is the half-sum of angles (79) and (119), and a the bisector (85) for the sunset, with its angle (86) which is the half-sum of angles (84) and (119). That means that the maximum angle that the mirror must rotate is (82), going from the reference position to the sunrise position. The angle (87) of rotation to the sunset is smaller in this case, which entails less drift. The situation is logically inverted in the left field, not depicted in the drawing, as it is symmetrical.

When assembled according to the parallel in the northern hemisphere, the mirrors south of the receiver are always on the same side as the sun, and the mirrors of the field north of the receiver are always on the other side of the sun with respect to the receiver. There are astronomical exceptions in the tropical area, so the definition of hemisphere must be applied not with respect to the geographical equator but rather to the plane containing the sun and the center of the planet at a given time.

The problem presented herein is that the height that the sun reaches in the working plane generally does not reach 90°, and it furthermore varies greatly throughout the year. Nevertheless, an angle referred to as Acf can be used as a higher value of the solar elevation in the working plane, the value of which angle is the sum of the complementary angle of the latitude of the location plus a value selected between 1° and 23°, 20° being used as a reference value (for taking into account that the power plant will perform better in the summer and that the inclination of the axis of the ecliptic is 23° 45') and this angle Acf having a maximum value of 90°. The analysis performed previously for the assembly according to the meridian conceptually serves for the assembly according to the parallel, replacing 90° with Acf in the previous equation, so the new radius of curvature when assembled according to the parallel, RCnp is $$RCnp=(2\cdot D)/(\cos((Acf-Aer)/2))$$

It should be specified that although basic requirements for the width of the mirrors have been given, the specific width of each mirror is determined depending on a value P, which is set by design, this value P being the quotient between the maximum drift of rays allowed in the mirrors and the value of the width R of the active surface (2) of the receiver (1); being identified, for the mirror in question, the angle Agm, which when assembled according to the meridian is half the largest angle of the following two angles:

the angle formed by the line going from the central point of the mirror to the central point of the active surface of the receiver, with the line marking the arrival of solar rays, during actual sunrise, on the central point of the mirror;

the angle formed by the line going from the central point of the mirror to the central point of the active surface of the receiver, with the line marking the arrival of solar rays, during actual sunset, on the central point of the mirror;

and when assembled according to the parallel said angle Agm is half the angle formed by the line going from the central point of the mirror to the central point of the active surface of the receiver with the line having from the central point of the mirror an angle of sight on the positive x-axis equal to the sum of the complementary angle of the latitude plus 20°, without being able to exceed this angle of sight of 90°;

the width E of the mirror in question being that given by the equation $$E=(2\cdot P\cdot R)/(1-\cos Agm)$$

Figure 8:
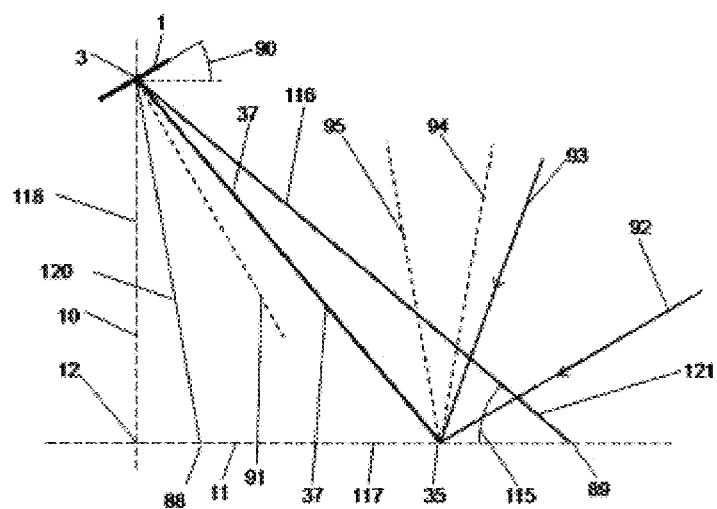
FIG. 8 shows the representative angles of the rotation of a mirror while following the daytime path in an assembly according to the parallel when the mirrors are south of the receiver in the northern hemisphere.
Figure 9:
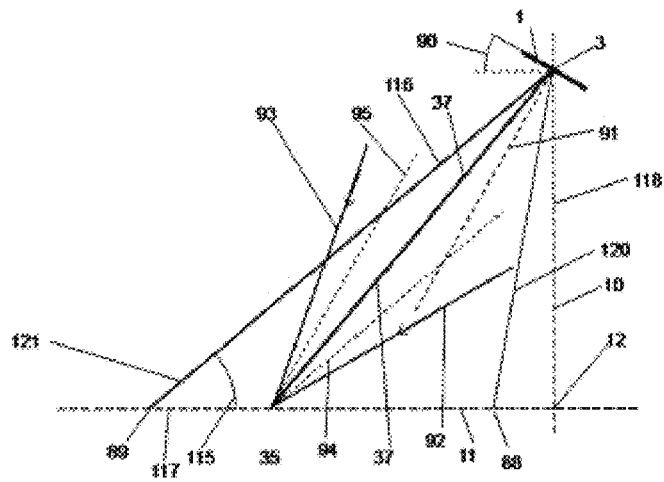
FIG. 9 shows the representative angles of the rotation of a mirror while following the daytime path in an assembly according to the parallel when the mirrors are north of the receiver in the northern hemisphere.

FIGS. 8 and 9 respectively show a receiver and a field assembled according to the local astronomical latitude, or east-west, in the first case with the mirrors deployed south of the receiver in the northern hemisphere, and in the second case with the mirrors deployed north in the northern hemisphere. The positions would be inverted in the south.

FIG. 8 also shows the height H (118) at which the central point (3) of the active face (2) of the receiver (1) is located and the angle of inclination (90) of the latter with respect to the x-axis. The requirement adopted for this inclination is that the active face is normal to the bisector of the field, which is the bisector of the angle formed by the lines joining the point (3) with the central points (88) and (89) of the closest mirror (5) and furthest mirror (32), respectively, such bisector being line 91.

In this case the position of the rays in sunrise and sunset coincide due to symmetry between morning and evening, as indicated with rays (92). Rays (93) represent the maximum height that the sun acquires, which varies throughout the year. This variation also affects assembly according to the meridian because solar radiation at the time it reaches zenith in the working plane decreases in winter and increases in summer. For the case of FIG. 8, bisectors (94) and (95) corresponding to the lowest (actual sunrise and sunset) and highest moments of the sun in the working plane, in which the corresponding bisector must be normal to the mirror at its central point, are shown.

FIG. 9 shows that the angles of reflection in that assembly with the field north of the receiver in an east-west assembly are less than those of the previous case in FIG. 8, which has other effects that are discussed below in this section. This figure shows other elements serving to carry out the invention, such as the horizontal distance or transverse length of the field of mirrors (117) reaching from the central point (88) of the closest mirror to the central point (89) of the furthest mirror, from which the central point (3) of the active face (2) of the receiver (1) is seen with an angle of elevation (115), said visual being line (116), the segment of which between points (3) and (89) is the distance Dmax used to size the width of the active face (2) of the receiver (1).

The mirrors are assembled adjacently on the corresponding lines of low pillars (9) maintaining their rotating shaft (14), which in turn is the main beam from which small transverse brackets rigidly supporting the longitudinal mirror emerge, leaving a small space between two consecutive parallel mirrors, which space is between 0.1 and 5% of the width of mirror, according to ground assembly tolerances.

On the other hand, carrying out the invention entails erecting a structure supporting longitudinal receiver at a certain height. The height at which the receiver is located and the transverse length of the field of mirrors, as well as the longitudinal dimension of the receiver and the mirrors, are design parameters that are selected depending on the solar radiation concentration to be obtained in the receiver and do not limit the application of the invention. Nor is it limited by the materials used in each component of the system, although for basic reasons said materials should have the optical and thermal properties suited to their function, and the mirrors, for example, should have high reflectivity for the direct solar radiation photons. Examples of the application of the invention to different solar radiation concentration objectives are provided at the end of this section.

The inclination of the active surface (2) of the receiver (1) is defined in that it must be normal to the bisector of the field (91) from the central point of the active face of the receiver, said bisector being that of the angle which is formed with the lines going from the central point of the active face of the receiver to the central point (88) of the mirror (5) closest to the receiver (1) and to the central point (89) of the furthest mirror (32). In terms of the height of the central point (3) of the active face (2) of the receiver (1), there are no direct but rather indirect defining requirements because the value of the acute angle (115) formed with the horizontal the line joining the central point (89) of the furthest mirror (32) of the field and the central point (3) of the active surface (2) of the receiver (1) is selected in a range of values between 10° and 80°, with a reference value of 45°. This value is in turn related to the amount of surface that is covered with the field of mirrors and the maximum distance allowed between the last mirror and the receiver, because when this distance is very large, in summer conditions with very hot air atmospheric turbulence jeopardizes the focusing of the rays from far mirrors on the receiver.

As an indication of the concentration factor attainable with conventional devices, it should be pointed out that in parabolic trough collectors all the radiation arriving through the optical opening of the mirror, which is in the order of 6 m in the cross-section, in the circumference of a tube 7 cm in diameter, i.e., 22 cm in circumference, is concentrated because even though only the bottom semi-circumference is illuminated, the other is heated by internal conduction and convection. That entails a concentration factor of 27, measured along the entire circumference. If it is measured on the illuminated semi-circumference, it is 54. With those values, heat transfer fluid temperatures above 400° C. are obtained, although it is commonly limited to less as the oil used degrades at a higher temperature. That means that in the assembly of this invention, a concentration of the order of 50 must be obtained.

It can be seen in FIG. 1 that there are two reflection configurations in these assemblies according to whether the sun is on the same side as the field of mirrors with respect to the receiver, referred to as cis position, such as in the field on the right of FIG. 1, or whether the sun and the field of mirrors are on different sides with respect to the receiver, referred to as trans position, and it is the case of the field on the left in FIG. 1. At a first glance, the trans position makes better use of the surface of the mirror because it has a smaller semi-angle of reflection, and the amount of radiation effectively reflected by a perfect mirror per surface area of mirror with respect to the incident radiation is the incident source radiation multiplied by the cosine of the semi-angle of reflection. However two effects must be observed: first, the mirrors are not perfect, they have non-zero absorptivity which attenuates radiation, but this absorptivity decreases as the semi-angle of reflection increases, so the cis position is advantageous with respect to the trans position; second, the mirrors in cis position have more horizontal positions and cast fewer shadows on one another when placed adjacently, unlike the mirrors in trans position which do have optical interferences when placed adjacently, again benefiting those in cis position when the mirrors are placed very close to one another. This is an essential requirement to achieve a high concentration factor although the mirrors in trans position are not used in a fully efficient manner because some of them will not receive radiation as they are in the shadow of the neighboring mirror.

In that sense, and with the virtually adjacent mirrors covering a field in cis position, like that of FIG. 8, or in trans position like that of FIG. 9, virtually all the solar radiation can be recovered with two loss factors:

the cosine effect of the incident radiation (4) with respect to that vertical to the ground (which is the cosine of the angle complementary to angle (75)), which is an astronomical datum that which must be projected on the working plane at all times and is equal for cis and trans fields;

the reflectivity of the mirrors, which will be greater in cis fields than in trans fields, although there the material of the mirror and its cleaning will be fundamental.

These factors are less than 1 and are a function of elements not related to the invention but can be characterized by representative values, such as 0.88 for the cosine value and 0.93 for reflectivity. To achieve the concentration, the invention has the optical-geometric capacity of projecting on a small space, which is the width of the active surface of the receiver, a broad reflective surface which is the transverse length of the entire field of mirrors corresponding to it. In FIGS. 8 and 9 this length L (117) is represented by the distance between points (88) and (89), which are the centers of the closest and furthest mirrors. Of course between consecutive mirrors there is discontinuity, but two semi-mirrors have also been deducted from the first and the last. Moreover, in an approximate manner it can be assumed that the closest mirror starts at the x coordinate 0 of that general coordinate system of the field, and the field of mirrors ends at distance L (117), which is related to the maximum distance of the mirror furthest from the center of the receiver, which is Dmax (116) and which gives rise to the width of the active face of the receiver, R $R = 0.01 \cdot D\text{max}$ If the angle formed by the line going from the center of the last mirror to the center of the receiver is called Aelev (115), the following elementary properties are true $L = D\text{max} \cdot \cos \cdot A\text{elev}$ $H = D\text{max} \cdot \sin A\text{elev}$ H (118) being the height at which the center of the receiver is located.

The following can be chosen as a representative data set for a power plant
Dmax=100 m
R=1 m
H=50 m, which is the same as setting Aelev to 30°, so
L=86.6 m
L/R=86.6
And the raw concentration factor, f, would be $f = 86.6 \cdot 0.88 \cdot 0.93 = 70.9$ which is a value that is even excessive for the purpose sought.

One of the greatest limitations can be in the height of the columns of the receiver and another in the angle Aelev, which cannot be too low. If the following is used as an alternative example
H=30 m
Aelev=45°
then
L=30 m
Dmax=42.5 m
R=0.425 m
L/R=70.7

$f = 70.7 \cdot 0.88 \cdot 0.93 = 57.87$ which seems to be a sufficient concentration factor for being able to compete with conventional parabolic trough collectors and gives a clear idea that carrying out the invention is not only feasible but also entails important technical and economic advantages in harnessing solar thermal energy.

Although the mirrors have been defined with a perpendicular section corresponding to a circular arc, their curvature is very minor because their radius is so long in relation to the width of the mirror. That induces the possibility, represented in FIG. 10, of physically building the arc of the mirror as polygonal, inscribed or circumscribed in the arc, which would mean that the mirror is formed by juxtaposed planar parts supported on a suitable longitudinal support (113), which are the characteristic transverse members emerging from the turn semi-axis (114) of the mirror, which is integral with the supporting shaft (14) in the bearings (15) which in turn are supported in the low pillars. Therefore, the mirror is built by juxtaposing preferably equal planar parts with a width S, this width being the width of the segment existing between points (111) and (112) intersecting with the original arc of the mirror (31), of the delimiting radii (105) and (108) of a polygonal module, having the same center (20) of the original arc of the mirror (31) as the center, each module corresponding to an angular aperture in the center of the circle (20) equal to the total angular aperture (106) with which the entire original mirror (31) is covered divided by the number of polygonal modules with which the mirror is built, which provides the angular aperture of a module (107) which, applied to one of the ends of the original mirror, identifies the mentioned delimiting radii (105 and 108) of the primer polygonal module, the bisector (109) of said angle of aperture of that module to which the segment of mirror between the points (111) and (112) of the end rays ends intersecting with the circular sector is perpendicular also being identified, said segment is selected from the inscribed or circumscribed segment, this selection being consecutively applied to adjacent consecutive modules, to cover the entire angular aperture of the mirror.

Having clearly described the invention, it is hereby stated that the particular embodiments described above are susceptible to modifications in detail provided that they do not alter the fundamental principle and the essence of the invention.

The invention claimed is:

1. Concentrating device for concentrating solar radiation, with longitudinal mirrors and a longitudinal receiver, based on a array of concave mirrors parallel to one another, having a longitudinal geometry, with a greater length than width, which can rotate about a longitudinal axis of symmetry, which in turn is an axis serving as support in bearings, which are placed on at intervals pillars which are buried in the ground and rigidly support the bearings, wherein the securing axis, which is a rotating shaft, is always fixed in a straight line position, each mirror being orientated by rotation for reflecting radiation towards a longitudinal parallelepiped solar receiver, the longitudinal axis of symmetry thereof located at a height H above the height of the axis of the mirror closest to the receiver as a result of columns or pillars supporting the receiver, with an active face where the receiver receives radiation reflected by the mirrors, the active surface having a transverse width R; the receiver containing internal elements absorbing solar radiation, said receiver having a longitudinal geometry and a greatest length parallel to the longitudinal axes of the mirrors, and having a transverse angle of inclination with respect to horizontal, wherein a final mirror is furthest from the receiver, two fields of mirrors being able to be assembled symmetrically with respect to two parallel receivers with active faces arranged opposite one another, each face pointing to a field in assemblies in which the longitudinal axes follow the local meridian, and being assembled both to the north and to the south of the receiver in cases in which the longitudinal axes of the mirrors are parallel to a local astronomical latitude, in which assemblies can also be two parallel receivers with the active faces arranged opposite one another, each face pointing to a field, the positions and angles being expressed in a coordinate system in a working plane used, which is a plane perpendicular to the longitudinal axes, and transversely and perpendicularly intersects the receiver and the mirrors, the position of the sun being projected on said working plane according to astronomical data, and a y-axis of the coordinate system in the working plane being a vertical line passing through a central or mid-point of a segment representing the active face of the receiver in the working plane, and an x-axis being a horizontal line passing through a central point of a segment which, in the working plane, represents the mirror closest to the receiver; selecting the value of the acute angle forming with a horizontal the line joining the central point of the furthest mirror of the field and the central point of the active surface of the receiver in a range of values between 10° and 80°, with a reference value of 45°; and the inclination of the active face of the receiver being determined, wherein the segment marking said surface in the working plane is perpendicular to the bisector of the field, said bisector being an angle formed with lines going, respectively, from the central point of the active face of the receiver to the central point of the closest mirror, and to the central point of the furthest mirror, the transverse width of the active surface or face of the receiver is 1% of the straight line distance between the central point of the furthest mirror of the field and the central point of the active surface of the receiver; and the mirrors are made of two different parts on each side of the central point of each mirror, both parts having a circular concavity, but with different radii of curvature, the latter radius being selected in a range of values between twice the distance from the central point of the mirror to the central point of the active surface of the receiver, and the radius value increased by 20%; the slope of the mirror being zero at a central point measured in an intrinsic coordinate system of each mirror, in which a y-axis is the normal at a central point and the reference position of the mirror coincides with a line joining said central point with the central point of the active face of the receiver; and in each of the mirrors, the central point of the specular surface coincides in the section with a longitudinal securing axis about which the mirror in question is rotated.

2. The concentrating device for concentrating solar radiation with longitudinal mirrors and a longitudinal receiver according to claim 1, wherein a specific width of each mirror is determined depending on a value P, which is set by design, the value P being the quotient between the maximum drift of rays allowed in the mirrors and the value of the width R of the active surface of the receiver; an angle Agm being identified for the mirror in question, the angle when assembled according to the meridian being half the largest angle of the following two angles:

an angle formed by a e line going from the central point of the mirror to the central point of the active surface of the receiver with the line marking the arrival of solar rays, during actual sunrise, on the central point of the mirror;

an angle formed by a line going from the central point of the mirror to the central point of the active surface of the receiver with the line marking the arrival of solar rays, during actual sunset, on the central point of the mirror;

and when assembled according to the parallel said angle Agm is half the angle formed by a line going from the central point of the mirror to the central point of the active surface of the receiver with the line having from the central point of the mirror an angle of sight on the positive x-axis equal to the sum of the complementary angle of the latitude plus 20°, without being able to exceed this angle of sight of 90°;

the width E of the mirror in question being that given by the equation $$E = 2 \cdot P \cdot R / (1 - \cos Agm).$$

3. The concentrating device for concentrating solar radiation with longitudinal mirrors and a longitudinal receiver according to claim 1, wherein when assembled according to the meridian, the radius of curvature, RCn, of a mirror is established by $$RCn = 2 \cdot D / (\cos((90° - Aer)/2))$$

D being the distance from the central point of the mirror to the central point of the active surface of the receiver, and Aer being the angle of sight of the line joining the central point of the mirror in question with the central point of the active surface (2) of the receiver (1) with respect to the positive x-axis of the general coordinate system, which is parallel to the horizontal of the location.

4. The concentrating device for concentrating solar radiation with longitudinal mirrors and a longitudinal receiver according to claim 1, wherein when assembled according to the parallel, the angle Acf is defined as the sum of the value of the complementary angle of the latitude of the location plus a value selected between 1° and 23°, 20° being used as a reference value of an addend, the value of Acf not being able to exceed 90°; Aer being the angle of sight of the line joining the central point of the mirror with the central point of the receiver with respect to the positive x-axis of the general coordinate system, and D being the distance from the central point of the mirror in question to the central point of the active surface of the receiver, the radius of curvature when assembled according to the parallel, RCnp, being established at the value $$RCnp = 2 \cdot D / (\cos((Acf - Aer)/2).$$

5. The concentrating device for concentrating solar radiation with longitudinal mirrors and a longitudinal receiver according to claim 1, wherein rotation given to each of the mirrors for focusing on the sun at all times is defined in that the normal to the mirror in the central point coincides with the bisector of the angle formed in a working plane by projection in the working plane of the central ray of the solar beam striking the central point and the line going from the central point to the central point of the active surface of the receiver already defined in the working plane; and said central point of the specular surface coinciding with the longitudinal axis of rotation of the mirror.

* * * * *